United States Patent
Li et al.

(10) Patent No.: US 10,558,752 B2
(45) Date of Patent: *Feb. 11, 2020

(54) SUMMARIZING AND VISUALIZING INFORMATION RELATING TO A TOPIC OF DISCUSSION IN A GROUP INSTANT MESSAGING SESSION

(71) Applicant: International Business Machines Corporation, Armonk, NY (US)

(72) Inventors: Shi Kun Li, Shanghai (CN); Ka Lin, Shanghai (CN); Fang Lu, Shanghai (CN); Dan Zhang, Shanghai (CN); Junqian Zhou, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 190 days.

This patent is subject to a terminal disclaimer.

(21) Appl. No.: 15/194,770

(22) Filed: Jun. 28, 2016

(65) Prior Publication Data
US 2017/0139900 A1 May 18, 2017

Related U.S. Application Data

(63) Continuation of application No. 14/943,341, filed on Nov. 17, 2015.

(51) Int. Cl.
*H04L 12/58* (2006.01)
*G06F 17/27* (2006.01)
(Continued)

(52) U.S. Cl.
CPC ...... *G06F 17/2765* (2013.01); *G06F 3/04817* (2013.01); *G06F 17/21* (2013.01); *G06F 17/248* (2013.01); *H04L 51/04* (2013.01)

(58) Field of Classification Search
CPC .... G06F 3/04817; G06F 17/248; G06F 17/21; G06F 17/2765; H04L 51/04
(Continued)

(56) References Cited

U.S. PATENT DOCUMENTS 8,001,126 B2    8/2011    Berry et al.
8,892,645 B2    11/2014    Jones et al.
(Continued)

FOREIGN PATENT DOCUMENTS

CN           104731881 A      6/2015

OTHER PUBLICATIONS

Kakadiya et al., "Sending Chat Messages to New Columns in Group Chat Sessions", An IP.com Prior Art Database Technical Disclosure, IP.com No. 000242061, IP.com Electronic Publication: Jun. 16, 2015, Copyright 2015 Cisco Systems, Inc., 5 pages.
(Continued)

*Primary Examiner* — Esther B. Henderson
*Assistant Examiner* — Nazia Naoreen
(74) *Attorney, Agent, or Firm* — Monchai Chuaychoo

(57) ABSTRACT

Summarizing and visualizing information relating to a topic of discussion in a group instant messaging session is provided. A message from a client device of a plurality of client devices is received. One or more keywords from the message are extracted based, at least in part, on at least one of (i) one or more natural-language processing algorithms and (ii) one or more text mining algorithms. The one or more keywords are incorporated into a model that includes a plurality of keywords and describes, at least in part, a topic of a group instant messaging session among the plurality of client devices. At least one of (i) the model and (ii) instructions describing how to update the model are distributed to the plurality of client devices.

10 Claims, 10 Drawing Sheets

(51) Int. Cl.
*G06F 17/24* (2006.01)
*G06F 3/0481* (2013.01)
*G06F 17/21* (2006.01)

(58) Field of Classification Search
USPC .......................................................... 709/206
See application file for complete search history.

(56) References Cited

U.S. PATENT DOCUMENTS

| | | | |
|---|---|---|---|
| 9,209,992 B2* | 12/2015 | Nelke | ...................... H04L 51/04 |
| 2007/0300169 A1 | 12/2007 | Jones et al. | |
| 2008/0028031 A1* | 1/2008 | Bailey | ..................... G06Q 10/10 |
| | | | 709/207 |
| 2009/0235280 A1* | 9/2009 | Tannier | .................. G06Q 10/00 |
| | | | 719/318 |
| 2011/0131207 A1* | 6/2011 | Jonsson | ............... G06Q 10/107 |
| | | | 707/730 |
| 2012/0046936 A1* | 2/2012 | Kandekar | .......... G06Q 30/0282 |
| | | | 704/9 |
| 2013/0103772 A1* | 4/2013 | Lau | ........................ H04L 51/04 |
| | | | 709/206 |
| 2014/0324982 A1 | 10/2014 | Agrawal et al. | |
| 2016/0301639 A1* | 10/2016 | Liu | ........................ G06Q 50/01 |

OTHER PUBLICATIONS

"Content-based chat history tree", An IP.com Prior Art Database Technical Disclosure, Authors et. al.: Disclosed Anonymously, IP.com No. 000241921, IP.com Electronic Publication: Jun. 9, 2015, 7 pages.

Li et al., "Summarizing and Visualizing Information Relating to a Topic of Discussion in a Group Instant Messaging Session", U.S. Appl. No. 14/943,341, 14 pages, filed Nov. 17, 2015.

Appendix P, List of IBM Patents or Patent Applications Treated As Related, 2 pages, dated Jul. 19, 2016.

* cited by examiner

SUMMARIZING AND VISUALIZING INFORMATION RELATING TO A TOPIC OF DISCUSSION IN A GROUP INSTANT MESSAGING SESSION

TECHNICAL FIELD

The present invention relates generally to the field of instant messaging, and, more particularly, to summarizing and visualizing information relating to a topic of discussion in a group instant messaging session.

BACKGROUND OF THE INVENTION

Instant messaging (IM) is a type of communication that offers real-time text transmission over a network, such as the internet. Short messages are typically transmitted bi-directionally between two parties, when each user chooses to complete a thought and select "send". Some IM applications can use push technology to provide real-time text, which transmits messages character by character, as they are composed. Instant messaging systems tend to facilitate connections between specified known users (often using a contact list also known as a "buddy list" or "friend list"). Depending on the IM protocol, the technical architecture can be peer-to-peer (direct point-to-point transmission) or client-server (a central server retransmits messages from the sender to the communication device). More advanced instant messaging can add file transfer, clickable hyperlinks, Voice over IP, or video chat.

Natural language processing is a field of computer science, artificial intelligence, and linguistics concerned with the interactions between computers and human (natural) languages. As such, natural language processing is related to the area of human-computer interaction. Many challenges in natural language processing involve natural language understanding—that is, enabling computers to derive meaning from human or natural language input. Natural language processing can be combined with speech recognition to derive meaning from spoken language.

Speech recognition is the translation of spoken words into text. Speech recognition is referred to as automatic speech recognition, computer speech recognition, or "speech to text". Some speech-recognition systems use "speaker-independent speech recognition" while others use "training" wherein an individual speaker reads sections of text into the speech recognition system. These systems analyze the person's specific voice and use it to fine-tune the recognition of that person's speech, resulting in more accurate transcription. Systems that do not use training are called "speaker-independent" systems, whereas, systems that use training are called "speaker-dependent" systems. Speech-recognition applications can include voice user interfaces such as voice dialing, call routing, simple data entry, preparation of structured documents, speech-to-text processing, and direct voice input.

SUMMARY

According to one embodiment of the present disclosure, a method is provided. The method includes receiving, by one or more computer processors, a message from a client device of a plurality of client devices; extracting, by one or more computer processors, one or more keywords from the message based, at least in part, on at least one of (i) one or more natural-language processing algorithms and (ii) one or more text mining algorithms; incorporating, by one or more computer processors, the one or more keywords into a model that includes a plurality of keywords and describes, at least in part, a topic of a group instant messaging session among the plurality of client devices; and distributing to the plurality of client devices, by one or more computer processors, at least one of (i) the model and (ii) instructions describing how to update the model.

According to another embodiment of the present disclosure, a computer program product is provided. The computer program product comprises a computer readable storage medium and program instructions stored on the computer readable storage medium. The program instructions include program instructions to receive a message from a client device of a plurality of client devices; program instructions to extract one or more keywords from the message based, at least in part, on at least one of (i) one or more natural-language processing algorithms and (ii) one or more text mining algorithms; program instructions to incorporate the one or more keywords into a model that includes a plurality of keywords and describes, at least in part, a topic of a group instant messaging session among the plurality of client devices; and program instructions to distribute, to the plurality of client devices, by one or more computer processors, at least one of (i) the model and (ii) instructions describing how to update the model.

According to another embodiment of the present disclosure, a computer system is provided. The computer system includes one or more computer processors, one or more computer readable storage media, and program instructions stored on the computer readable storage media for execution by at least one of the one or more processors. The program instructions include program instructions to receive a message from a client device of a plurality of client devices; program instructions to extract one or more keywords from the message based, at least in part, on at least one of (i) one or more natural-language processing algorithms and (ii) one or more text mining algorithms; program instructions to incorporate the one or more keywords into a model that includes a plurality of keywords and describes, at least in part, a topic of a group instant messaging session among the plurality of client devices; and program instructions to distribute, to the plurality of client devices, by one or more computer processors, at least one of (i) the model and (ii) instructions describing how to update the model.

DETAILED DESCRIPTION

Embodiments of the present invention recognize that group instant messaging sessions can contain information about multiple topics, thereby presenting a challenge for participants who want to quickly and easily identify information regarding a specific topic of discussion. In addition, group instant messaging sessions (i.e., group IM sessions) can vary greatly in the number of participants, the amount of information exchanged, and the amount of time during which the group IM session takes place. For example, a session may consist of a single message from a first person and quick replies from a second person and a third person. In another example, a session may include many participants (e.g., more than three participants) discussing multiple topics over many hours. A user must often scroll through an entire history or section of chat messages in order to find information relevant to a specific topic of discussion (e.g., scheduling a social event). Furthermore, if one or more participants are using voice messages, a user may need to listen to each voice message, in sequential order, in order to fully comprehend the discussion.

Embodiments of the present invention provide for summarizing and visualizing information related to a topic of discussion in a group IM session. Various embodiments summarize and visualize information relating to a topic of discussion based, at least in part, on one or both of natural language processing (NLP) logic and speech recognition logic.

Figure 1:
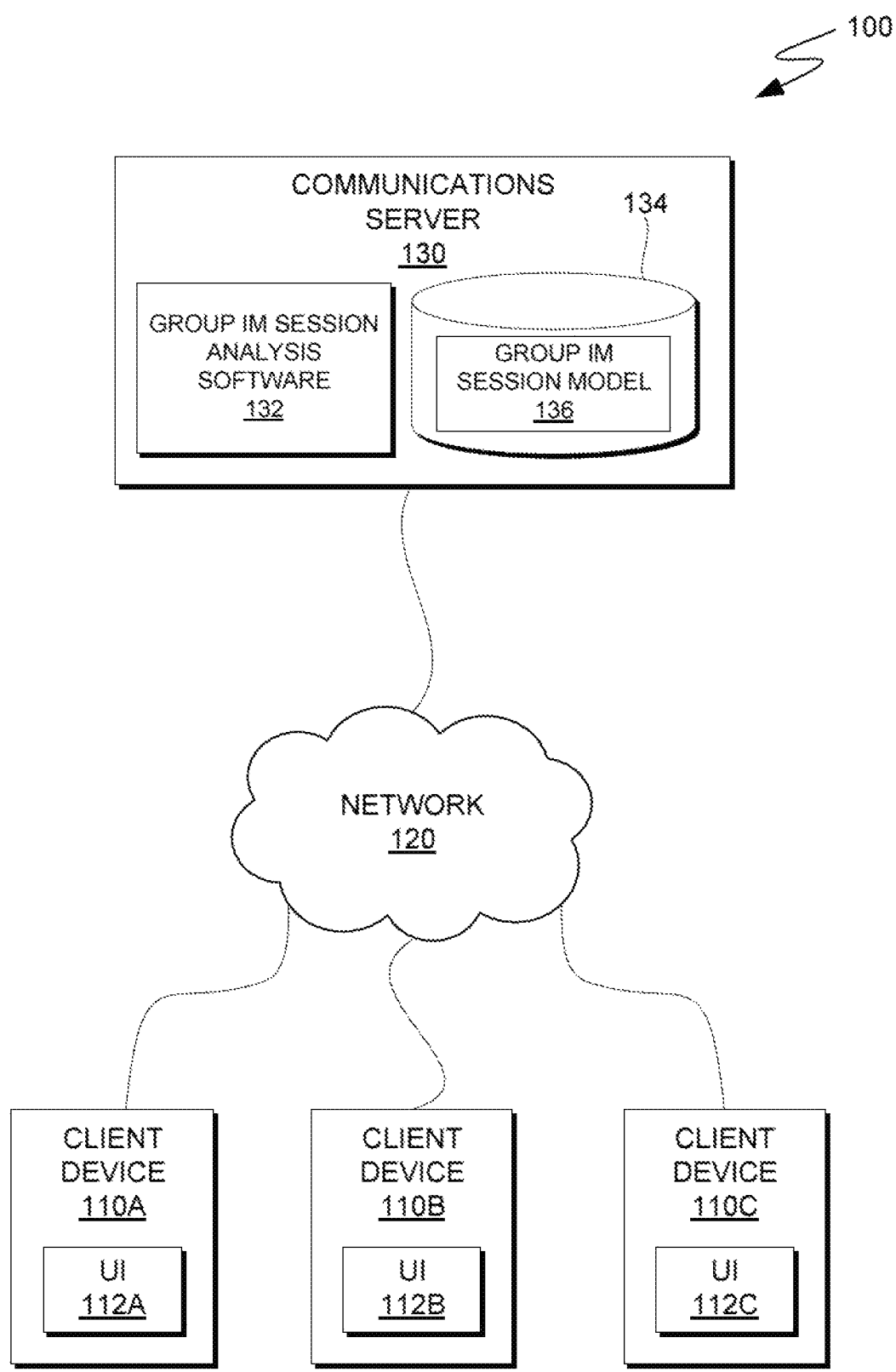
FIG. 1 is a functional block diagram illustrating a computing environment, in accordance with an embodiment of the present invention.

Embodiments of the present invention will now be described in detail with reference to the Figures. FIG. 1 is a functional block diagram illustrating a computing environment, in accordance with an embodiment of the present invention. For example, FIG. 1 is a functional block diagram illustrating computing environment 100. Computing environment 100 includes communications server 130, client device 110A, client device 110B, and client device 110C, all communicatively connected via network 120. Client devices 110A, 110B, and 110C are collectively referred to as client devices 110 herein. While the embodiment depicting FIG. 1 includes three client devices that are communicatively connected to communications server 130, the number of client devices 110 to which communications server 130 can communicatively connect to at any one time is not a limitation of the present invention. Accordingly, communications server 130 can communicatively connect to a greater or lesser number of client devices 110 than are depicted in FIG. 1 and the group IM sessions described herein with respect to FIGS. 2A-2D and 3A-3H.

In various embodiments, each of client devices 110 is a computing device that can be a standalone device, a server, a laptop computer, a tablet computer, a netbook computer, a personal computer (PC), a desktop computer, a personal digital assistant (PDA), a smart phone, or another type of programmable electronic device. In some embodiments, client devices 110 are a collection of different types of computing devices. In other embodiments, each of client devices 110 represents a computing system utilizing clustered computers and components to act as a single pool of seamless resources. In addition, each of client devices 110 includes a user interface (UI) by which a user can provide user input to a respective client device. In general, each of client devices 110 can be any computing device or a combination of devices that is capable of: communicating with other client devices of client devices 110; accessing communications server 130 and/or executing code that provides, at least in part, the functionality provided by communications server 130, as described herein; and providing a user interface, as described herein (e.g., user interfaces 112). Client devices 110 can include internal and external hardware components, as depicted and described in further detail with respect to FIG. 5.

Client devices 110A, 110B, and 110C respectively include user interface 112A, user interface 112B, and user interface 112C. User interfaces 112A, 112B, and 112C are collectively referred to as user interfaces 112 herein. User interfaces 112 execute locally on respective client devices and operate to provide user interfaces to users of the respective client devices. User interface 112A, for example, enables a user of client device 110A to communicate with users of client device 110B and/or client device 110C and provides data to communications server 130 for analysis by group IM session analysis software 132, as described herein. In some embodiments, user interface 112A is stored on client device 110A. In other embodiments, user interface 112A is stored on another computing device (e.g., communication server 130), provided that client device 110A can access and is accessible by group IM session analysis software 132. Similarly, user interfaces 112B and 112C can be stored locally or remotely. Persons of ordinary skill in the art will understand that, in general, a user interface is optimized for the computing device on which it is presented, and accordingly, user interfaces 112A, 112B, and 112C can differ from one another based, at least in part, on the types of computing devices on which they are presented (i.e., the type(s) of computing devices that variously describe client devices 110A, 110B, and 110C).

Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that will support communication among client devices 110 and between client devices 110 and communication servers 130.

Communications server 130 is a computing device that can be a standalone device, a wearable computing device, a server, a laptop computer, a tablet computer, a netbook computer, a personal computer (PC), or a desktop computer. In some embodiments, communications server 130 represents a computing system utilizing clustered computers and components to act as a single pool of seamless resources. In general, communications server 130 can be any computing device or a combination of devices with access to and/or capable of executing group IM session analysis software 132, with access to database 134, and provided that it can access and is accessible by client devices 110. In the embodiment depicted in FIG. 1, group IM session analysis software, database 134, and group IM session model 136 reside on communications server 130. In other embodiments, one or more of group IM session analysis software 132, database 134, and group IM session model 136 can reside on various other computing devices, provided that each resource can access the other resources and provide the functionality described herein. In yet other embodiments, one or both of group IM session analysis software 132, database 134, and group IM session model 136 can be stored externally and accessed through a communication network, such as network 120.

Database 134 is a data repository that may be written to and/or read by group IM session analysis software 132 and client devices 110. In some embodiments, database 134 can be written to and read by programs and entities outside of computing environment 100 in order to populate database 134 with data. In general, database 134 can store one or more: IM messages, text mining rules, NLP rules, speech recognition rules, group IM session models, IM topic templates, records of group IM session sessions, or any combination of these or other types of data related to summarizing and visualizing topics of group IM session sessions.

In the embodiment depicted in FIG. 1, database 134 stores group IM session model 136. Group IM session model 136 is data and metadata that describes a visualization of a group IM session (i.e., a group IM session) topic and is updated based, at least in part, on operations of group IM session analysis software 132, as described herein. In other embodiments, one or more versions of group IM session model 136 are stored on client devices 110 (e.g., a version of group IM session model 136 stored on a first type of client device can differ from a version of group IM session model 136 stored on a second type of client device). In yet other embodiments, database 134 stores a version of group IM session model 136 and one or more of client devices 110 store respective version(s) of group IM session model 136 that are based, at least in part, on the version of group IM session model 136 that resides in database 134. In various embodiments, whether or not a particular client device of client devices 110 accesses a remotely stored version of group IM session model 136 or a locally stored version of group IM session model 136 is based, at least in part, on the computing capabilities of the particular client device (e.g., on the relative "thickness" or "thinness" of the particular client device). A client device that accesses a remotely stored version of group IM session model 136 can access group IM session model 136 at periodic intervals in time and/or in response to receiving a notification from communications server 130 that group IM session model 136 has been updated. Client devices that access a locally stored version of group IM session model 136 can update the locally stored version of group IM session model 136 based, at least in part, on a comparison of the locally stored version with a remotely stored version and/or instructions received from communications server 130.

For descriptive simplicity, group IM session model 136 is a model of a single group IM session, and client devices 110 represent client devices that are participating in the group IM session that is described, at least in part, by group IM session model 136. Other groups of client devices participating in various group IM sessions can, however, connect to communications server 130 over network 120 and database 134 can store group IM session models that describe, at least in part, these additional group IM sessions. Persons of ordinary skill in the art will understand that is possible for a single client device to participate in more than one group IM session.

In the embodiment depicted in FIG. 1, group IM session analysis software 132 resides on communications server 130. In other embodiments, one or more client devices of client devices 110 execute respective instances of group IM session analysis software 132 in addition to, or as an alternative to, an instance of group IM session analysis software 132 that executes on communications server 130. Persons of ordinary skill in the art will understand that natural language processing, speech recognition, and other capabilities of group IM session analysis software 132, as described herein, generally require significant computational resources. Accordingly, whether or not it is advantageous to execute group IM session analysis software 132 on one on or more of client devices 110 is based, at least in part, on the computational capabilities of client devices 110.

Group IM session analysis software 132 operates to identify and manage information within a group IM session based, at least in part, on predefined criteria relevant to a specific group IM session (e.g., keyword types of an IM topic template selected by a user of one of client device 110, as described herein). In various embodiments, group IM session analysis software 132 employs one or both of natural language processing and text mining to summarize and visualize a topic of a group IM session. In various embodiments, group IM session analysis software 132 can receive voice message(s) and, using speech recognition, translate the voice message(s) into text-based message(s). The capabilities of group IM session analysis software 132 are discussed in greater detail with respect to FIGS. 2A-2D, FIGS. 3A-3H, and FIG. 4.

FIGS. 2A-2D depict a user interface that is updated based, at least in part, on instant messages exchanged in a group IM session and a model of the group IM session, in accordance with an embodiment of the present invention.

Figure 2A:
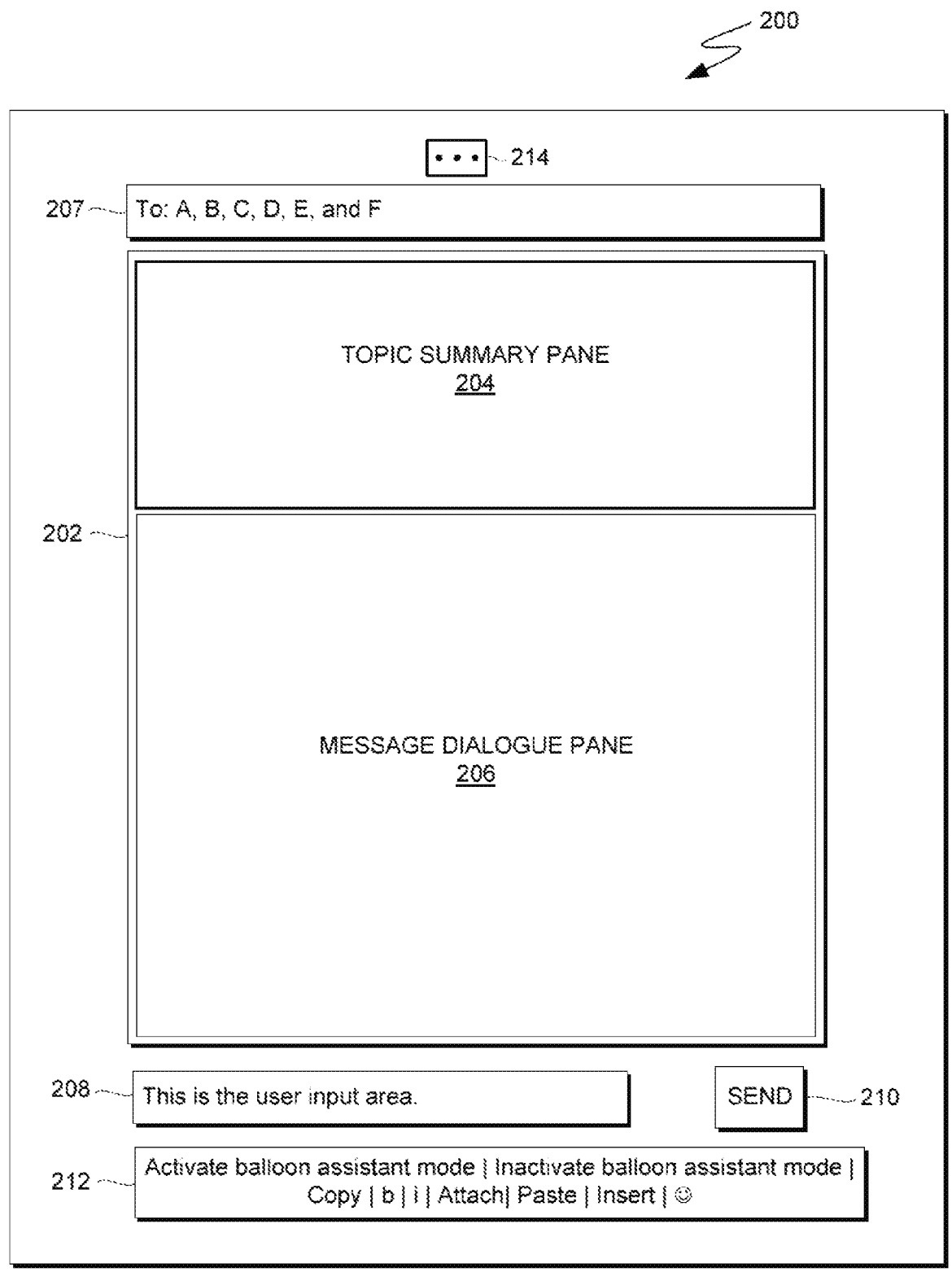
FIGS. 2A-2D depict a user interface that is updated based, at least in part, on instant messages exchanged in a group IM session and a model of the group IM session, in accordance with an embodiment of the present invention.

More specifically, FIG. 2A is a schematic diagram depicting an example of a user interface of a client device within the computing environment of FIG. 1, in accordance with an embodiment of the present invention. For example, user interface 200 is a user interface of a smartphone that is one of client devices 110. User interface 200 includes message window 202, recipient field 207, message box 208, send button 210, menu 212, and archive shortcut icon 214. In the embodiment depicted in FIGS. 2A-2D, message window 202 is divided (e.g., by a separator bar) into topic summary pane 204 and message dialogue pane 206. Message dialogue pane 206 is a field that can display information relating to a group IM session. For example, message dialogue pane 206 can display text, icons, or images communicated among client devices 110. Topic summary pane 204 displays information based on operations of group IM session analysis software 132 in order to visualize and summarize a topic of the group IM session displayed, at least in part, in message dialogue pane 206. In various embodiments, topic summary pane 204 can display text, icons, pictures, diagrams, or a combination thereof.

User interface 200 also includes various controls for initiating and participating in a group IM session. For example, recipient field 207 is a text field that presents the intended recipients of a message sent by the client device on which user interface 200 executes. Stated differently, recipient field 207 identifies target client devices based on associations between the target client devices and specific people. As used herein, "target client devices" are the client devices that, excluding the client device on which user interface 200 executes, comprise client devices 110. In FIGS. 2A-2D, for example, recipient field 207 indicates that the target client devices are client devices that are respectively associated with users A, B, C, D, E, and F. In some embodiments, like the embodiment depicted in FIGS. 2A-2D, recipient field 207 includes information that identifies the user of the client device on which user interface 200 executes. In other embodiments, recipient field 207 excludes information that identifies the user of the client device on which user interface 200 executes. In various embodiments, hovering and/or clicking on recipient field 207 activates a dialogue box and/or a menu with which a user can designate target client devices (e.g., to initiate a group IM session or to add new participants).

Message box 208 is a dialogue box into which a user of one of client devices 110 can input text in order to communicate the information to other client devices of client devices 110. In some embodiments, the user can also input various icons into message box 208 (e.g., emoji). Send button 210 is a button that the user can activate in order to transmit, over network 120, information in message box 208 to communications server 130 and/or client devices 110.

Menu 212 is one example of a menu that enables the user to, among other things, activate and inactivate a "balloon assistant mode." At least in part, activating the "balloon assistant mode" instructs a computing device, such as communications server 130, to analyze communications between client devices 110 using group IM session analysis software 132. In general, only one instance of the balloon assistant mode can be active at a time in any one group IM session. As used herein, an "initiating client device" and an "initiator" respectively refer to a client device and a user of the client device that activates the balloon assistant mode. Once an initiator of a first instance of the balloon assistant mode deactivates the first instance of the balloon assistant mode, the initiator of the first instance or a user of another client device can initiate a second, sequential instance of the balloon assistant mode as an initiator of the second instance. In various embodiments, a user can hover and/or click on archive shortcut icon 214 to activate a resource (e.g., a menu and/or dialogue box) that enables the user to view resolutions to previous instance(s) of the balloon assistant mode, as described herein.

Figure 2B:
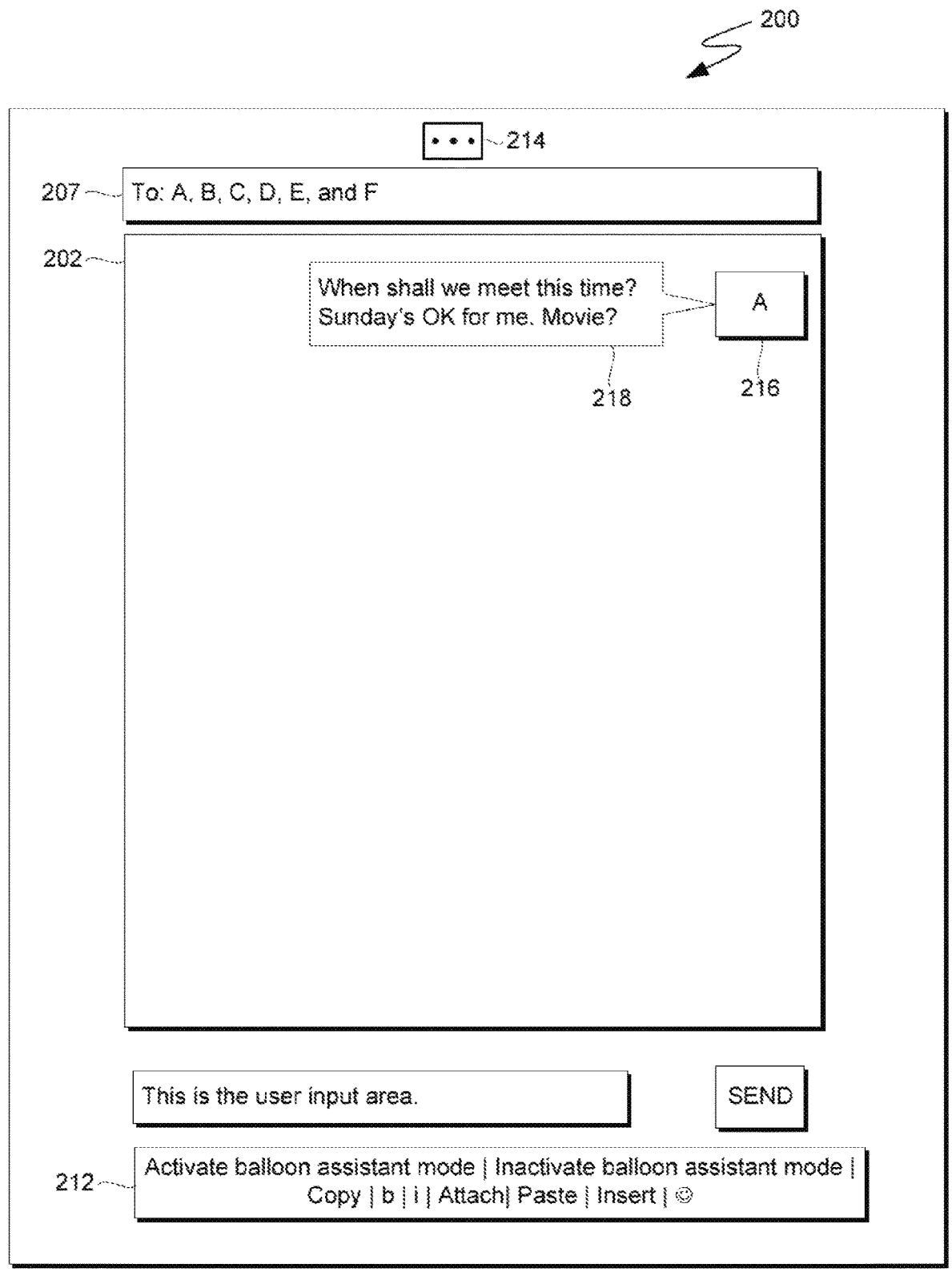

In FIGS. 2A-2D, user 216 (i.e., user A) is a user of the client device on which the depicted instance of user interface 200 executes. More specifically, FIG. 2B depicts an example of user interface 200 after user 216 has initiated a group IM session but has not activated the balloon assistant mode, in accordance with an embodiment of the present invention. In this example, message 218 is sent to the target client devices identified in recipient field 207 and is presented in message window 202 of user interface 200. In the embodiment depicted in FIG. 2B, message window 202 is not divided into topic summary pane 204 and message dialogue pane 206, as depicted in FIG. 2A, until the balloon assistant mode is activated. User 216 can activate the balloon assistance mode by selecting the "Activate balloon assistant mode" option from menu 212.

In various embodiments, activating the balloon assistant mode activates one or more menus or dialogues through which an initiator (e.g., user 216) can configure, at least in part, group IM session analysis software 132. As described herein, group IM session analysis software 132 utilizes natural language processing and/or text mining to analyze messages in a group IM session. The initiator can advantageously optimize group IM session analysis software 132 by selecting from among a plurality of predefined IM topic templates, customize a predefined IM topic template, create a new IM topic template, or otherwise describe a topic of discussion in a group IM session. For example, selecting an "appointment" IM topic template optimizes group IM session analysis software 132 by, at least in part, instructing group IM session analysis software 132 to extract, using natural language processing and/or text mining algorithms, keywords relating to "when" the appointment will occur, "where" the appointment will occur, and "what" the appointment is for.

The aforementioned "when," "where," and "what" are example of types of keywords (i.e., keyword types). An "appointment" can be a social, personal, or professional engagement. In another example, selecting an "action" IM topic template instructs group IM session analysis software 132 to extract keywords relating to "who" the action involves, "when" the action will occur, when an action is "due" or "expected" to occur, and "what" the action involves. In yet another example, a user creates a custom IM topic template by selecting one or more keyword types (e.g., "who," "what," "when," and/or "where") from among a list of keyword types. In addition, keyword types can be subdivided into two or more keyword sub-types. For example, an IM topic template can include "date" and "time" keyword sub-types to describe a group IM session including a discussion of "when" something (e.g., an appointment) will occur with more accuracy (e.g., a user can customize the "appointment" IM topic template by subsiding the "when" keyword type). In other embodiments, however, an initiator can activate the balloon assistant mode without selecting an IM topic template. For example, an initiator may choose not to select an IM topic template to save time and/or because predefined or user-created IM topic templates are not adequate to describe an intended topic of discussion in a group IM session. In yet other embodiments, group IM session analysis software 132 automatically selects an appropriate IM topic template based, at least in part, on a message in message window 202 (e.g., message 218).

Figure 2C:
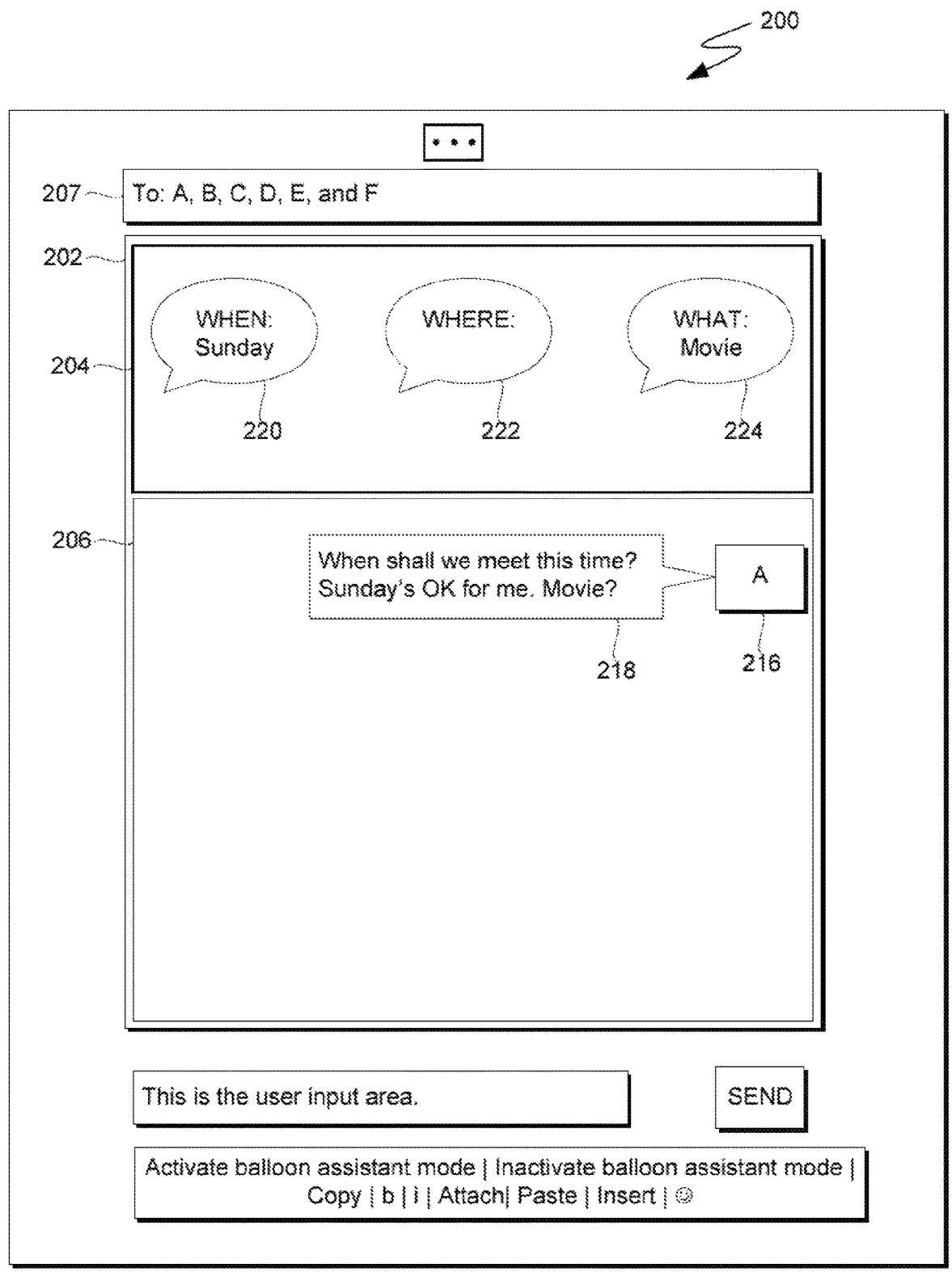

FIG. 2C depicts the example depicted in FIG. 2B following the activation of the balloon assistant mode and a selection of an IM topic template, in accordance with an embodiment of the present invention. Following activation of the balloon assistant mode, user interface 200 subdivides message window 202 into topic summary pane 204 and message dialogue pane 206. User interface 200 presents message 218 and an identifier associated with user 216 in message dialogue pane 206. User interface 200 presents balloon 220, balloon 222, and balloon 224 in topic summary pane 204. In the embodiments depicted in FIGS. 2C and 2D and FIGS. 3A-3H, user interface 200 presents various "balloons" as speech bubbles. In other embodiments, however, user interface 200 can present balloons as thought bubbles and/or balloons having polygonal shapes, circular shapes, ovular shapes, or other types of shapes. In general, "balloon" refers to any icon that can present (i.e., include text of) one or more keywords on user interface 200. In addition, user interface 200 can present balloons including different shapes in topic summary pane 204 (e.g., each keyword type is associated with a specific shape of balloon) and/or balloons can differ in size (e.g., the "top-ranked" balloon, as described herein, can be larger than lower-ranked balloons). Similarly, balloons can be presented in one or more colors (e.g., each keyword type is associated with a specific color of balloon). In some embodiments, the shape(s), size(s), and/or color(s) of the balloons are user-configurable settings of user interface 200. In other embodiments, the initiator can determine how user interfaces 112 present balloons on client devices 110. In yet other embodiments, the shape(s), size(s), and/or color(s) of the balloons are properties of group IM session model 136 and are not user-configurable settings.

In the example depicted in FIG. 2C, user 216 selected an "appointment" IM topic template based, at least in part, on message 218 (i.e., a message asking the group IM session participants to help plan a social engagement). Accordingly, balloon 220 is associated with a "when" keyword type, balloon 222 is associated with a "where" keyword type, and balloon 224 is associated with a "what" keyword type. Based, at least in part, on the selected IM topic template and message 218, group IM session analysis software 132 analyzes message 218 and constructs group IM session model 136, as described herein. In this example, group IM session analysis software 132 extracts the keywords "Sunday" and "Movie" from message 218 and includes these keywords in group IM session model 136. User interface 200 presents information in topic summary pane 204 in accordance with group IM session model 136. Accordingly, balloon 220 includes the keyword "Sunday" and balloon 224 includes the keyword "Movie." In the embodiment depicted in FIG. 2C, user interface 200 presents balloon 222 in topic summary pane 204 even though the group IM session does not include a keyword relating to the "where" keyword type (i.e., a "blank balloon"). In other embodiments, user interface 200 does not present balloons in topic summary pane 204 until the group IM session includes at least one keyword of respective keyword type(s).

Figure 2D:
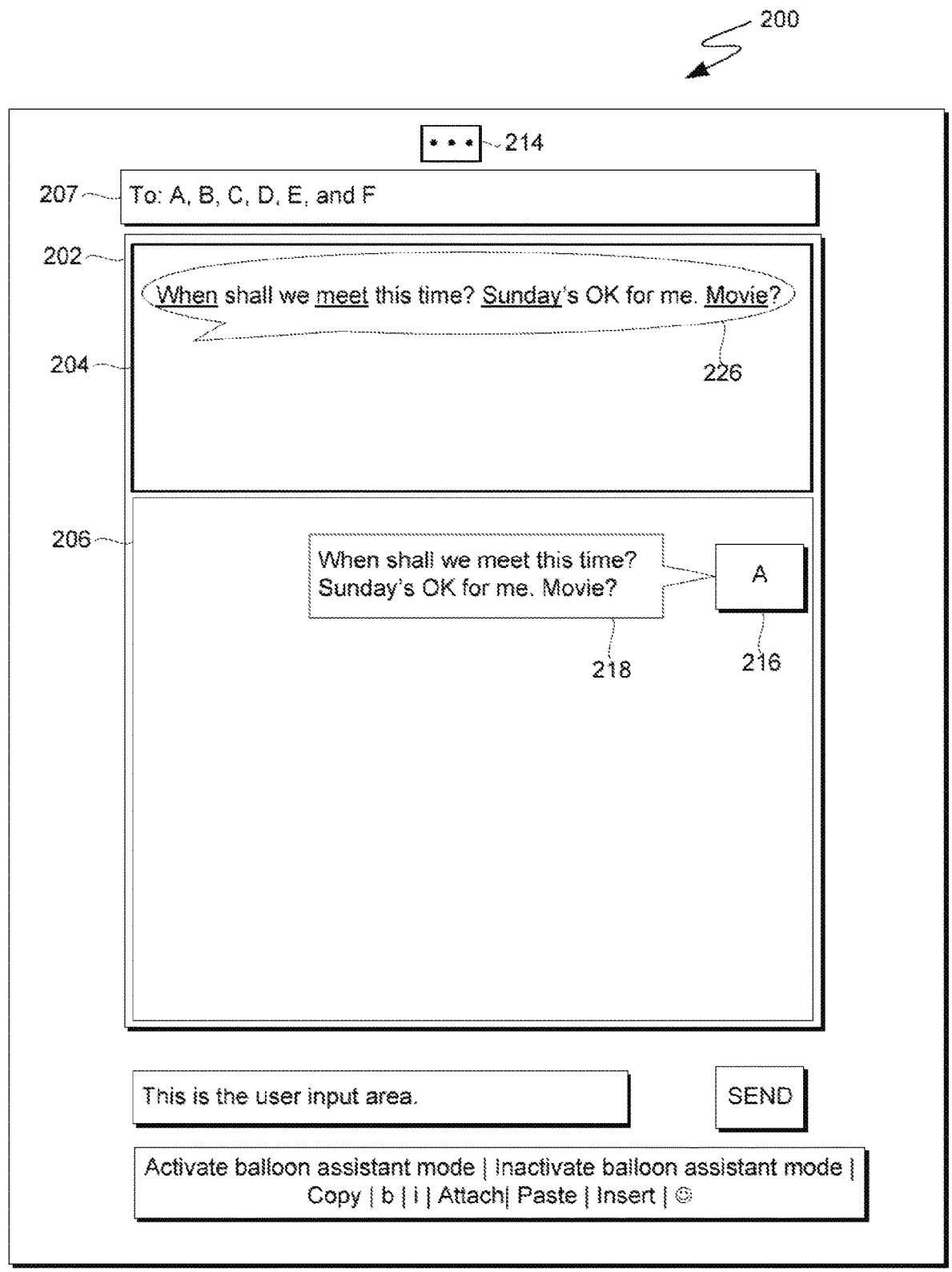

FIG. 2D depicts the example depicted in FIG. 2B following the activation of the balloon assistant mode and without a selection of an IM topic template, in accordance with an embodiment of the present invention. In FIG. 2D, user interface 200 presents balloon 226 in topic summary pane 204. Balloon 226 includes all of message 218. In some embodiments, like the embodiment depicted in FIG. 2D, group IM session analysis software 132 identifies potential keywords and constructs group IM session model 136 such that user interface 200 can identify the potential keywords (e.g., by underlining, italicizing, or highlighting) in balloon 226. In other embodiments, user interface 200 does not identify potential keywords based on group IM session analysis software 132 and group IM session model 136. In general, users of client devices 110 can vote, as described herein, on balloons that are not associated with a keyword type (e.g., balloon 226) in the same manner as balloons 220, 222, and 224 in order to reflect preferences with respect to a topic of discussion in the group IM session.

Figure 3A:
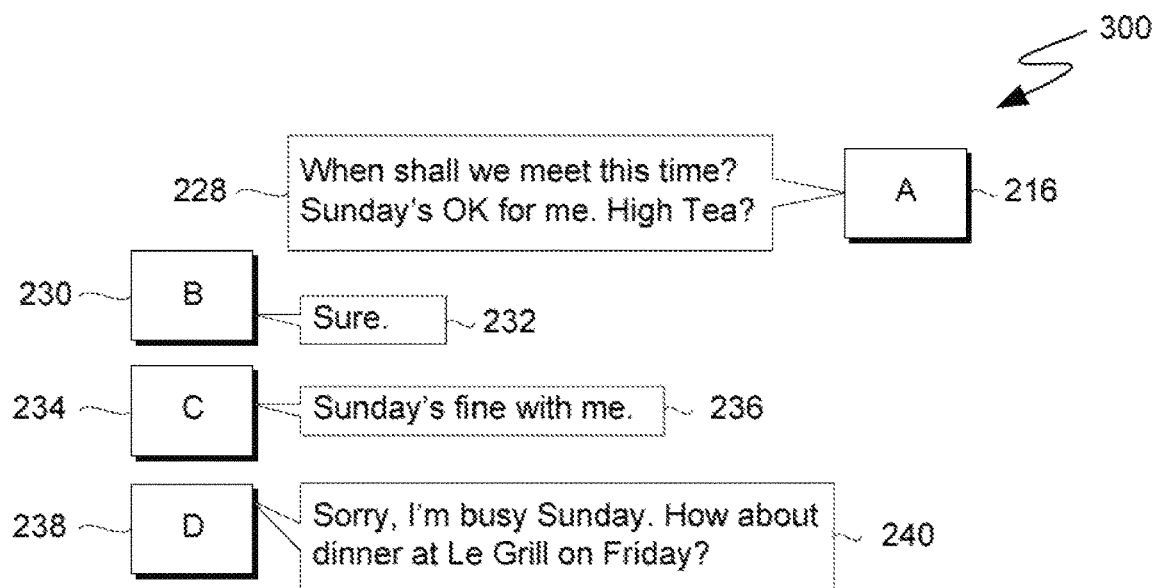
FIGS. 3A-3H depict a topic summary pane or message dialogue pane as presented on a user interface at various points in a group IM session, in accordance with an embodiment of the present invention.
Figure 3B:
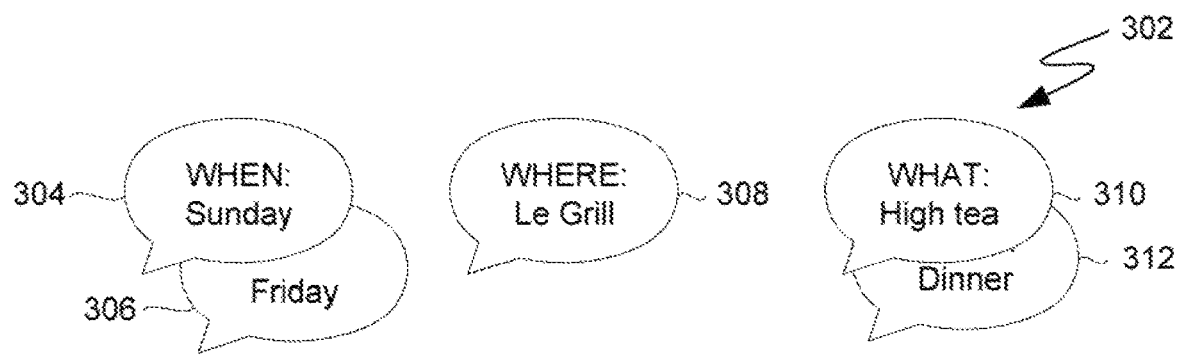
Figure 3C:
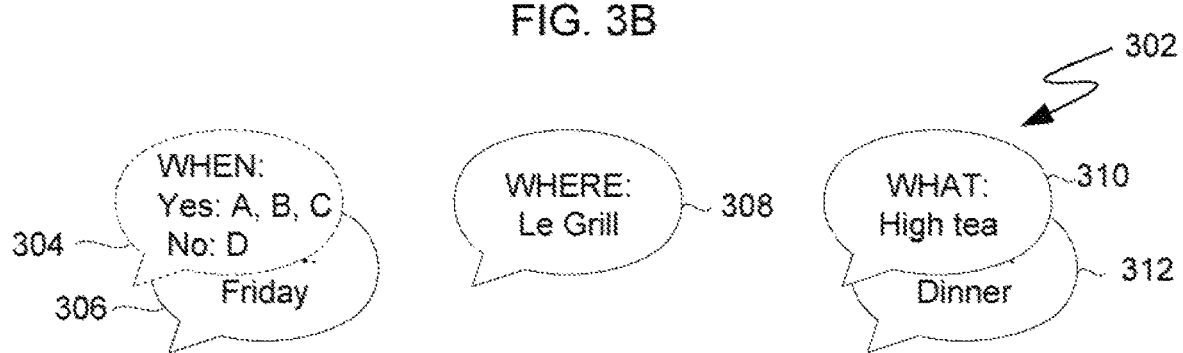
Figure 3D:
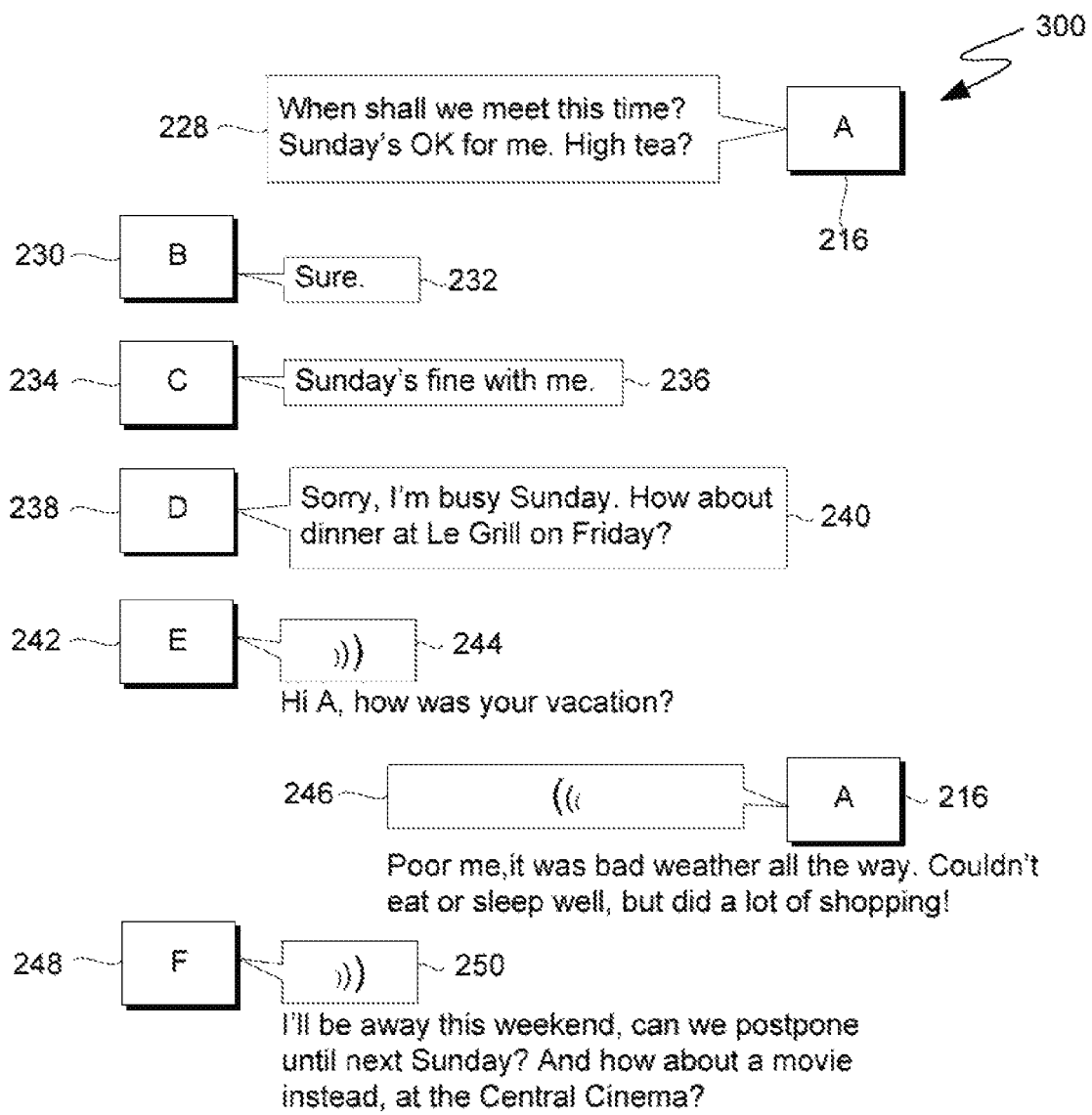
Figure 3E:
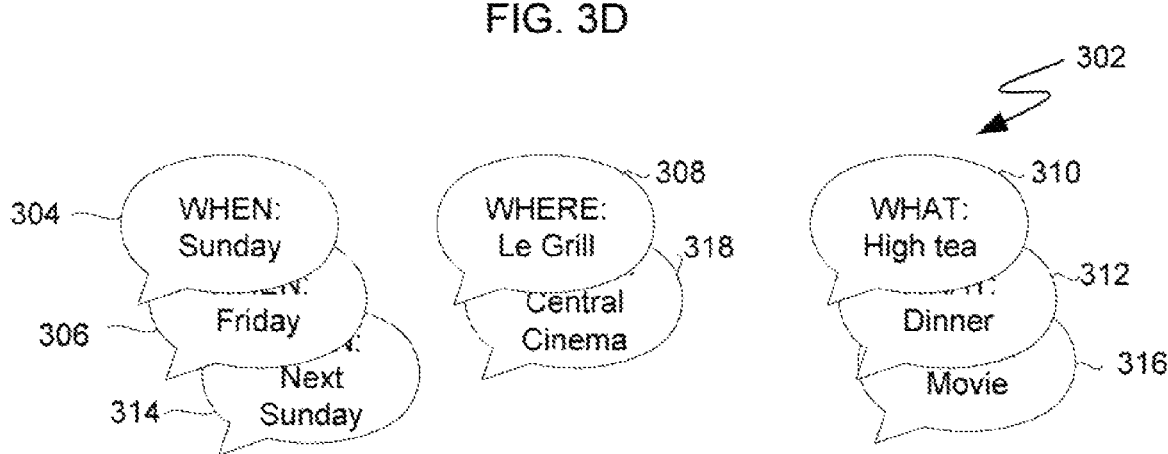
Figure 3F:
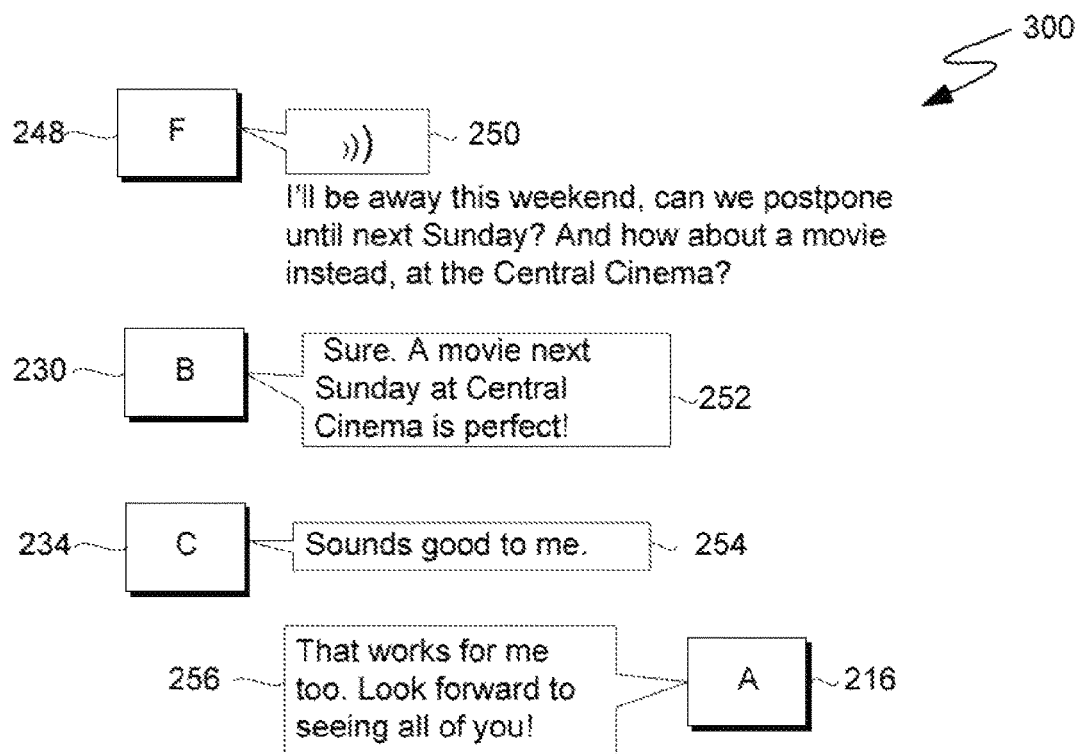

FIGS. 3A-3H depict a topic summary pane or message dialogue pane as presented on a user interface at various points in a group IM session, in accordance with an embodiment of the present invention. More specifically, FIGS. 3A, 3D, and 3F depict group IM session 300 in message dialogue pane 206 and FIGS. 3B, 3C, 3E, 3G, and 3H depict instance 302 of the balloon assistant mode, as presented in topic summary pane 204.

Group IM session 300, as depicted in FIG. 3A, includes messages from user 216 (i.e., user A), user 230 (i.e., user B), user 234 (i.e., user C), and user 238 (i.e., user D). As in the example discussed with respect to FIGS. 2B-2D, user 216 is the initiator of instance 302 of the balloon assistant mode. Similarly, message 228 is analogous to message 218 and requests that participants in group IM session 300 discuss plans for a social engagement. Accordingly, instance 302 of the balloon assistant mode utilizes the "appointment" IM topic template discussed with respect to FIG. 2C. User 230 responds to message 228 with message 232, indicating agreement with the proposal presented in message 228. User 234 responds to message 228 with message 236, similarly indicating agreement with at least the "when" of the proposal presented in message 228. User 238 responds to message 228 with message 240. Unlike messages 232 and 236, message 240 indicates disagreement with the "when," "where," and "what" of the proposal presented in message 228 and proposes an alternative (i.e., meeting for dinner, at Le Grill, on Friday).

Figure 4:
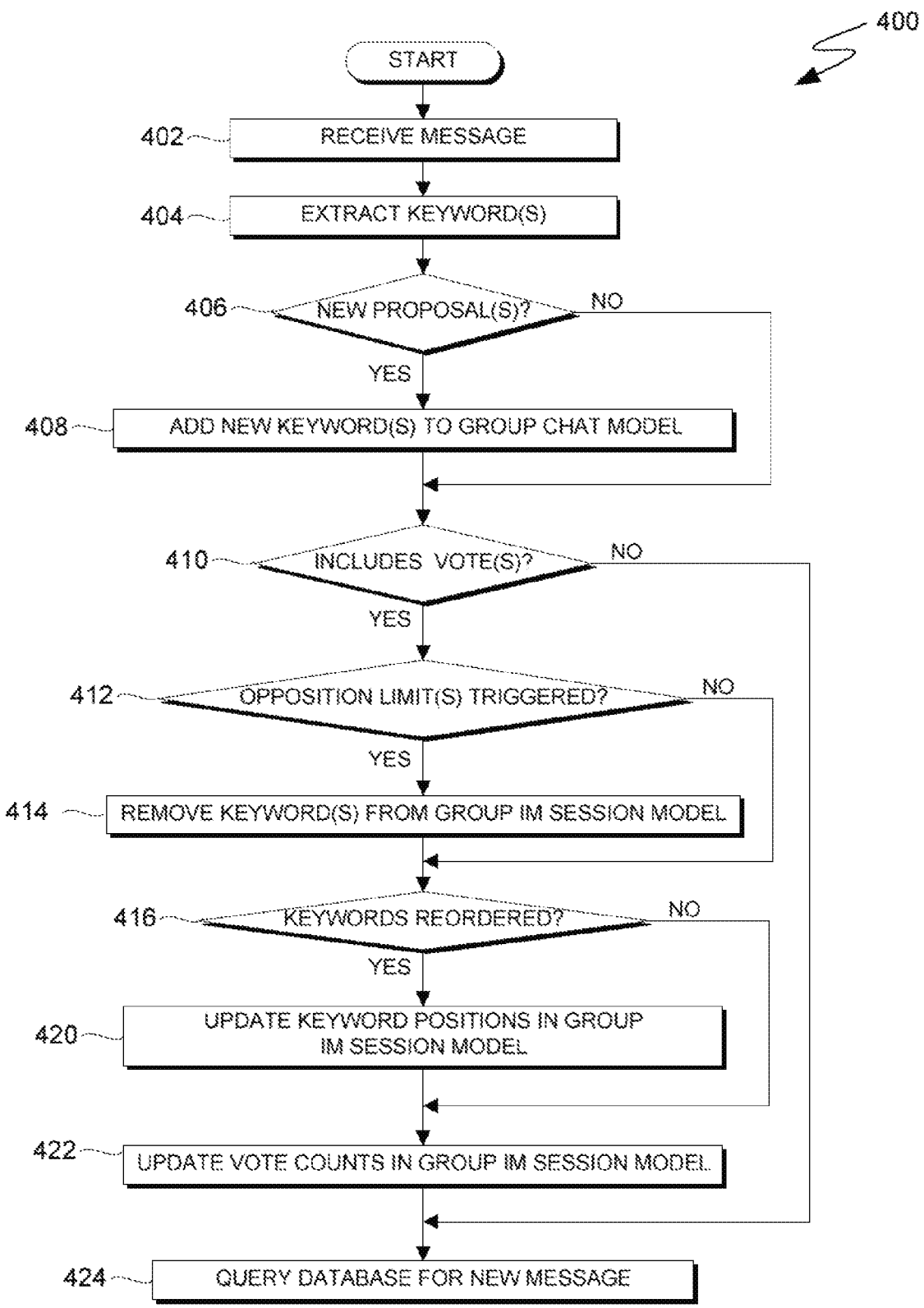
FIG. 4 is a flowchart depicting operations for summarizing and visualizing information relating to a topic of discussion in a group instant messaging session on a computing device within the computing environment of FIG. 1, in accordance with an embodiment of the present invention.

Group IM session analysis software 132 constructs group IM session model 136 upon initiation of instance 302 of the balloon assistant mode and iteratively updates group IM session model 136 in response to analyzing each message in group IM session 300, as described in greater detail with respect to FIG. 4. FIG. 3B depicts instance 302 of the balloon assistant mode as presented in topic summary pane 204 after group IM session model 136 is updated based, at least in part, on message 240. In FIG. 3B, topic summary pane 204 includes balloons 304, 306, 308, 310, and 312. Balloons 304 and 306 are associated with a "when" keyword type, balloon 308 is associated with a "where" keyword type, and balloons 310 and 312 are associated with a "what" keyword type. In general, the relative positions of balloons that are associated with the same keyword type is based on the number of "votes" for the keywords associated with the respective balloons. The "top-ranked" balloons are the balloon that, for each keyword type, receive the most "yes" votes. In various embodiments, the top-ranked balloons are presented above and/or on-top-of lower ranked balloons. In some embodiments, a balloon including one or more keywords is presented for each keyword type, and keywords are positioned (i.e., ordered or ranked) above or below other keywords based on votes, as described herein. In the example depicted in FIG. 3B, balloons 304, 308, and 310 are the top-ranked balloons. In some embodiments, group IM session analysis software 132 registers votes for a keyword based on message(s) in the group IM session. In group IM session 300, for example, group IM session analysis software 132 registers "yes" votes for balloons 304 and 310 based on messages 228, 232 and 236. More specifically, group IM session analysis software 132 registers "yes" votes for both of balloons 304 and 310 in connection with user 216 and user 230, respectively, based on message 228, from which the respective keywords were extracted, and message 232, which indicates general agreement with the proposal in message 228. Message 236, however, is more ambiguous and open to interpretation. In various embodiments, whether group IM session analysis software 132 registers a "yes" vote, a "no" vote, or a "neutral" vote (i.e., neither a "yes" vote nor a "no" vote) for a balloon in connection with user 234 is based, at least in part, on one or more semantic voting thresholds. Because message 236, for example, can be interpreted as indicating agreement with the "when" (i.e., Sunday), but not the "what" (i.e., High Tea), proposed in message 228, semantic voting threshold(s) can be set such that group IM session analysis software 132 registers a "yes" vote for only balloon 304. Similarly, semantic voting threshold(s) can be set such that message 236 is interpreted as being neutral towards the "what" keyword type or as a "no" vote against balloon 310 (i.e., High Tea). In various embodiments, one or more semantic voting thresholds are based, at least in part, on setting(s) configured via user interface 200. In some embodiments, one or more semantic voting thresholds are not based on setting(s) configured via user interface 200.

In the example depicted in FIG. 3A, message 240 proposes alternatives to the idea proposed in message 228. Group IM session analysis software 132 recognizes that "dinner" is a keyword that should be associated with the "what" keyword type, that 'Le Grill" is a keyword that should be associated with the "where" keyword type, and that "Friday" is a keyword that should be associated with the "when" keyword type. Group IM session model 136 and user interfaces 112 are updated accordingly (i.e., balloons 306, 308, and 312 are added to topic summary pane 204). In addition, group IM session analysis software 132 registers one "yes" vote for each of balloons 306, 308, and 312 in connection with user 238. Group IM session analysis software 132 also recognizes that "Sorry, I'm busy Sunday" indicates disagreement with the day proposed in message 228 and registers a "no" vote for balloon 304 in connection with user 238. In some embodiments, a "yes" vote for a keyword of a keyword type causes group IM session analysis software 132 to register "no" votes for any other keyword of the same keyword type. In other embodiments, group IM session analysis software 132 recognizes that a "yes" vote for a keyword indicates that a user is merely "neutral" towards other keywords of the same keyword type and will register "no" votes if, in the future, the user indicates disagreement with other keywords of the same keyword type. User 234, for example, can vote "no" for balloon 306 after receiving message 240 if group IM session analysis software 132 recognizes that user 234 is merely "neutral" to balloon 306, even though various embodiments of group IM session analysis software 132 would have registered a "yes" vote for balloon 304 in connection with user 234 based on message 236. In general, users of client devices 110 can changes their votes with respect to a particular keyword, but the users can only vote "yes" for one keyword in a keyword type and can only vote "no" once for each keyword. Requiring users of client devices 110 to affirmatively vote "no" can, however, advantageously enable the users to vote down alternative proposals (i.e., various keywords) that they do not agree with (i.e., demonstrate a preference for alternatives/keywords that they are merely "neutral" to over alternatives/keywords that they disagree with or are otherwise opposed to).

In addition, some embodiments include an opposition limit threshold that can be set via user interface 200 and/or is a predetermined setting of group IM session analysis software 132. If the number of "no" votes with respect to a keyword exceeds the opposition limit threshold, group IM session model 136 is updated such that user interfaces 112 of client devices 110 do not present the respective keyword (e.g., a respective balloon is removed from topic summary pane 204).

In other embodiments, users of client devices 110 can vote "yes" for a keyword by dragging a respective balloon up (e.g., using a touch-sensitive screen or pad, a mouse, or another type of input device) relative to other balloon(s). In such embodiments, users of client devices 110 can similarly vote "no" for a keyword by dragging a respective balloon down relative to other balloon(s). Votes registered in this manner are communicated to communications server 130 and/or other client devices of client devices 110 in order to update group IM session model 136. In yet other embodiments, votes are registered based, at least in part, on either of analyses of messages via group IM session analysis software 132 or by users of client devices 110 dragging balloons on user interfaces 112.

In the example depicted in FIG. 3C, users of client devices 110 can view the votes associated with a keyword by hovering and/or clicking on a respective balloon. In embodiments like the one depicted in FIG. 3C, user interface 200 identifies the users that voted "yes" and "no" (and in some embodiments, "neutral") on the respective balloon. For example, hovering over balloon 304 "flips over" balloon 304 to reveal that users 216, 230, and 234 votes "yes" for Sunday and that user 238 voted "no" Sunday, as described herein.

In the embodiment depicted in FIG. 3D, group IM session analysis software 132 includes speech-recognition algorithms that enable group IM session analysis software 132 to translate audio messages into text messages. User interfaces 112, of which user interface 200 represents one instance, present the translated messages within group IM session 300, as depicted in FIG. 3D. For example, message 244 from user 242, message 246 from user 216, and message 250 from user 248 are voice messages that group IM session analysis software 132 converted to text messages.

In addition, group IM session analysis software 132 recognizes messages that are not relevant to the topic associated with a current instance of the balloon assistant mode based, at least in part, on speech-recognition algorithm(s); a selected IM topic; a message from an initiator (e.g., message 228) and any subsequent, related message(s) (e.g., messages 232, 236, and 240); or any combination of the aforementioned options. Group IM session analysis software 132 ignores messages that are not relevant to the topic associated with the current instance of the balloon assistant mode. Accordingly, group IM session model 136 does not reflect these unrelated, ignored messages. For example, group IM session analysis software 132 recognizes that messages 244 and 246 are not related to instance 302 of the balloon assistant mode and ignores them.

FIG. 3E depicts instance 302 of the balloon assistant mode, as presented in topic summary pane 204, after group IM session model 136 is updated based, at least in part, on message 250. Message 250 proposes an additional alternative proposal. In this example, message 250 proposes that the participants in group IM session 300 meet for a movie at the "Central Cinema" on "next Sunday." User interface 200 ads balloons 314, 318, and 316 to topic summary pane 204 based, at least in part, on message 250. Balloon 314 presents "Next Sunday" and is associated with the "when" keyword type. Balloon 318 presents "Central Cinema" and is associated with the "where" keyword type. Balloon 316 presents "Movie" and is associated with the "what" keyword type. Group IM session model 132 registers, in connection with user 248, "yes" votes for balloons 314, 316, and 318 accordingly. In various embodiments, like the embodiment depicted in FIG. 3E, balloons having the same number of "yes" votes are ranked in chronological order with earlier created balloons appearing above and/or on-top-of later-created balloons. For example, balloon 308 is the top-ranked balloon among balloons 308 and 318, in the embodiment depicted in FIG. 3E, because the "Le Grill" keyword appears before the "Central Cinema" keyword in group IM session 300. In some embodiments, however, balloons having the same number of "yes" votes are ranked in accordance with respective "neutral" and/or "no" votes, and "no" votes can have the same of greater weight than "neutral" votes depending on the specific embodiments. In such embodiments, balloons associated with identical votes or votes of equal cumulative weight can be ranked in chronological order.

In the embodiment depicted in FIG. 3F, group IM session 300 includes messages received in response to message 250. For example, user 230 sends message 252, user 234 sends message 254, and user 216 sends message 256 in response to message 250. Messages 252, 254, and 256 variously indicate agreement with the alternative proposal presented in message 250. Accordingly, group IM session analysis software 132 registers votes and updates group IM session model 136 as described herein.

Figure 3G:
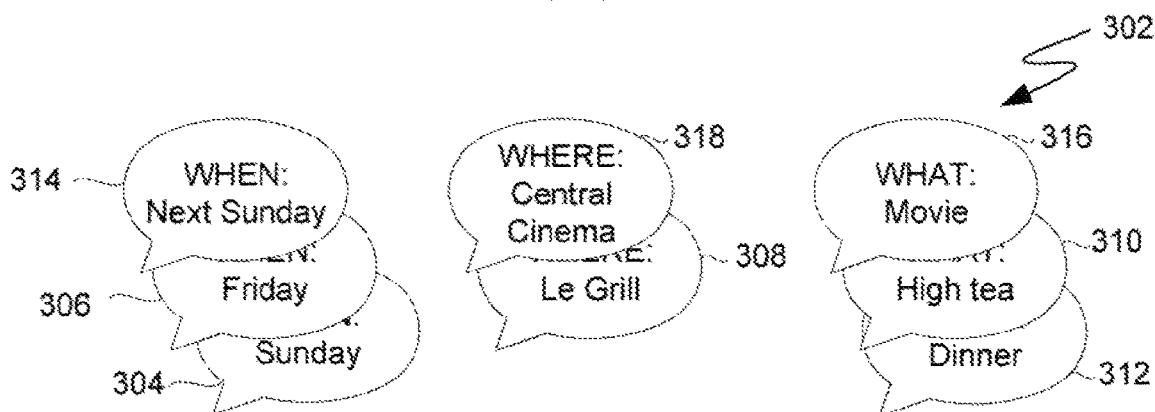

FIG. 3G depicts instance 302 of the balloon assistant mode, as presented in topic summary pane 204, after group IM session model 136 is updated based, at least in part, on message 256. As a result of votes registered based on messages 252, 254, and 256, balloons 314, 316, and 318 are the top-ranked balloons of the respective keyword types. In various embodiments, group IM session analysis software 132 associates "yes" votes with a different keyword without registering a "no" vote for the keyword, of the same keyword type, that was previously associated with the "yes" vote. In the example depicted in FIG. 3G, balloon 306, is ranked higher than balloon 304 because balloon 304 is associated with one "no" vote from user D, as depicted in FIG. 3C, and only "neutral" votes from users 216, 230, and 234 (i.e., users A, B, and C) subsequent to message 256. In this example, balloon 306, however, is associated with one yes vote from user 238 (i.e., user D).

Figure 3H:
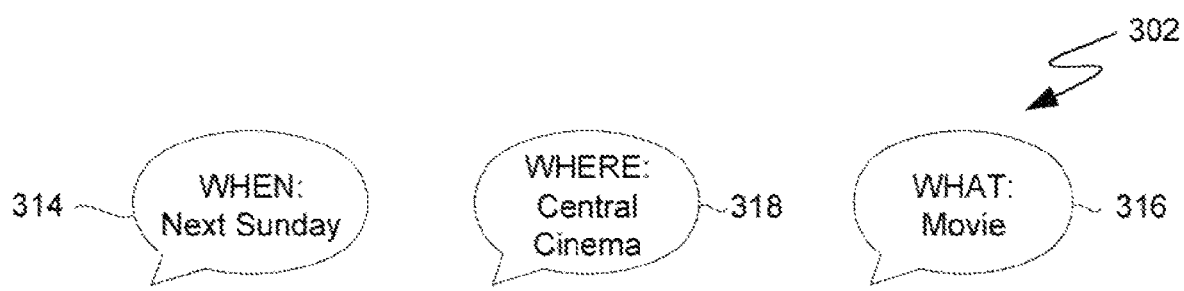

FIG. 3H depicts instance 302 of the balloon assistant mode, as presented in topic summary pane 204, after the initiator selects the "Inactivate balloon assistant mode" option from menu 212 of user interface 200. In embodiments like the embodiment depicted in FIG. 3H, user interface 200 presents a "conclusion" of a group IM session (e.g., group IM session 300) after the initiator inactivates the instance of the balloon assistant mode (e.g., instance 302). A "conclusion" of an instance of the balloon assistant mode is represented by the top-ranked keyword(s) (i.e., balloons) prior to the inactivation of the instance. In the example, depicted in FIG. 3H, "Next Sunday" was the top-ranked keyword of the "when" keyword type, "Central Cinema" was the top-ranked keyword of the "where" keyword type, and "Movie" was the top-ranked keyword of the "what" keyword type. Collectively, balloons 314, 318, and 316 represent a plan, among at least some of the participants in group IM session 300, to meet next Sunday for a movie at the Central Cinema. Communications server 130 and/or one or more of client devices 110 archives the conclusion of instance 302 of the balloon assistant mode so that user(s) of (i) client devices 110 or (ii) the respective client device(s) can view the conclusion on user interface 200 (i.e., user interfaces 112) by selecting archive shortcut icon 214. Any user of client devices 110 can initiate a new instance of the balloon assistant mode in group IM session 300 following the inactivation of instance 302 of the balloon assistant mode.

FIG. 4 is a flowchart depicting operations for summarizing and visualizing information relating to a topic of discussion in a group instant messaging session on a computing device within the computing environment of FIG. 1, in accordance with an embodiment of the present invention. More specifically, FIG. 4 depicts operations 400 of group IM session analysis software 132 on communications server 130.

Group IM session analysis software 132 receives a message (operation 402) and extracts one or more keywords from the message based, at least in part, on natural language processing and/or text mining algorithms, as described herein (operation 404). In some embodiments, keywords are also extracted based on an IM topic template, as described herein.

Group IM session analysis software 132 determines whether or not extracted keywords indicate a new proposal (decision 406) based, at least in part, on natural language processing and/or text mining algorithms, as described herein. If group IM session analysis software 132 determines that one or more of the extracted keywords indicate a new proposal (i.e., they are new keywords; decision 406, YES branch), the new keywords are added to group IM session model 136 and are associated with respective keyword types (operation 408). If group IM session analysis software 132 determines that none of the extracted keywords indicate a new proposal (decision 406, NO branch), decision 410 is performed.

Group IM session analysis software 132 determines whether or not the received message indicates agreement or disagreement with any keyword(s) included in group IM session model 136 (i.e., includes one or more vote(s)) and accordingly registers votes as described herein (decision 410). If group IM session analysis software 132 determines that the received messages does not include any votes (decision 410, NO branch), decision 424 is performed. Persons of ordinary skill in the art will understand that a message that includes no new proposal and includes no indication of agreement or disagreement with a keyword (i.e., with an existing proposal, a least in part), the message is not relevant to the topic described by group IM session model 136. If group IM session analysis software 132 determines that the received message includes "yes," "no," and/or "neutral" votes (decision 410, YES branch), group IM session model 136 is updated accordingly and decision 412 is performed. In decision 412, group IM session analysis software 132 determines whether or not the vote(s) trigger any opposition limits (e.g., if an opposition limit thresholds is exceeded, as describe herein). If an opposition limit is triggered (decision 412, YES branch), group IM session analysis software 132 removes respective keywords from group IM session model 136 (operation 414). User interfaces 112 of client devices 110 update accordingly. If an opposition limit is not triggered (decision 412, NO branch), group IM session analysis software 132 determines whether or not the vote(s) reorder/re-rank the keywords included in group IM session model 136 (i.e., whether balloons need to be reordered on user interfaces 112; decision 416). If group IM session analysis software 132 determines that the vote(s) reorder/re-rank any keywords (decision 416, YES branch), group IM session analysis software 132 updates keyword positions in group IM session model 136 accordingly. If group IM session analysis software 132 determines that the vote(s) do not reorder/re-rank any keywords (decision 416, NO branch), group IM session analysis software 132 updates vote counts associated with respective keywords in group IM session model 136 (operation 422). Group IM session analysis software 132 also updates the vote counts if the vote(s) reorder/re-rank any keyword. As described herein, the rank/order of keywords of various keyword types is reflected in the relative position of respective balloons on user interfaces 112. Group IM session analysis software 132 can also perform decisions 412 and 416 and operations 414, 420, and 422 in response to receiving voting information that is not associated with a text or voice message (e.g., if a user drags a balloon up or down relative to other balloon(s) of the same keyword type on user interface 200).

In operation 424, group IM session analysis software 132 queries database 134 for a new message and iteratively performs operations 400 until the initiator deactivates the instance of the balloon assistant mode.

Figure 5:
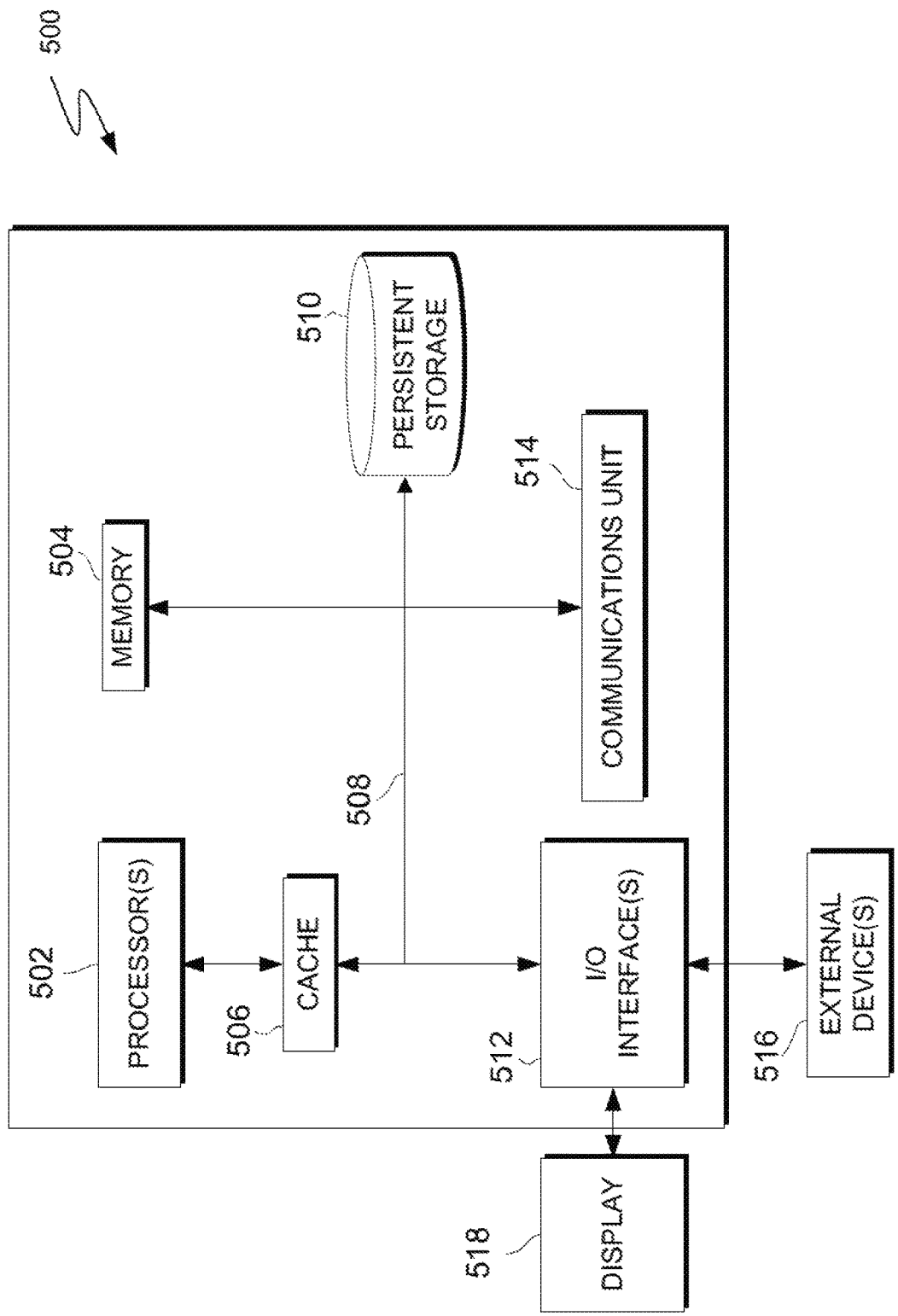
FIG. 5 is a block diagram of components of a computing device executing operations for distinguishing important information within a group IM session, in accordance with an embodiment of the present invention.

FIG. 5 is a block diagram of components of a computing device, generally designated 500, in accordance with an embodiment of the present invention. In one embodiment, computing system 500 is representative of communications server 130 within computing environment 100, in which case communications server 130 includes group IM session analysis software 132. It should be appreciated that FIG. 5 provides only an illustration of one implementation and does not imply any limitations with regard to the environments in which different embodiments may be implemented. Many modifications to the depicted environment may be made.

Computing system 500 includes processor(s) 502, cache 506, memory 504, persistent storage 510, input/output (I/O) interface(s) 512, communications unit 514, and communications fabric 508. Communications fabric 508 provides communications between cache 506, memory 504, persistent storage 510, communications unit 514, and input/output (I/O) interface(s) 512. Communications fabric 508 can be implemented with any architecture designed for passing data and/or control information between processors (such as microprocessors, communications and network processors, etc.), system memory, peripheral devices, and any other hardware components within a system. For example, communications fabric 508 can be implemented with one or more buses or a crossbar switch.

Memory 504 and persistent storage 510 are computer readable storage media. In this embodiment, memory 504 includes random access memory (RAM). In general, memory 504 can include any suitable volatile or non-volatile computer readable storage media. Cache 506 is a fast memory that enhances the performance of processor(s) 502 by holding recently accessed data, and data near recently accessed data, from memory 504.

Program instructions and data used to practice embodiments of the present invention may be stored in persistent storage 510 and in memory 504 for execution by one or more of the respective processor(s) 502 via cache 506. In an embodiment, persistent storage 510 includes a magnetic hard disk drive. Alternatively, or in addition to a magnetic hard disk drive, persistent storage 510 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 510 may also be removable. For example, a removable hard drive may be used for persistent storage 510. Other examples include optical and magnetic disks, thumb drives, and smart cards that are inserted into a drive for transfer onto another computer readable storage medium that is also part of persistent storage 510.

Communications unit 514, in these examples, provides for communications with other data processing systems or devices. In these examples, communications unit 514 includes one or more network interface cards. Communications unit 514 may provide communications through the use of either or both physical and wireless communications links. Program instructions and data used to practice embodiments of the present invention may be downloaded to persistent storage 510 through communications unit 514.

I/O interface(s) 512 allows for input and output of data with other devices that may be connected to computer system 500. For example, I/O interface(s) 512 may provide a connection to external device(s) 516 such as a keyboard, keypad, a touch screen, and/or some other suitable input device. External device(s) 516 can also include portable computer readable storage media such as, for example, thumb drives, portable optical or magnetic disks, and memory cards. Software and data used to practice embodiments of the present invention can be stored on such portable computer readable storage media and can be loaded onto persistent storage 510 via I/O interface(s) 512. I/O interface(s) 512 also connect to display 518.

Display 518 provides a mechanism to display or present data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term(s) "Smalltalk" and the like may be subject to trademark rights in various jurisdictions throughout the world and are used here only in reference to the products or services properly denominated by the marks to the extent that such trademark rights may exist.

As used herein, a list of alternatives such as "at least one of A, B, and C" should be interpreted to mean "at least one A, at least one B, at least one C, or any combination of A, B, and C."

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:

receiving, by one or more computer processors of a first client device of a plurality of client devices, a message from a second client device of the plurality of client devices;

analyzing, by the one or more computer processors, the message utilizing a template that identifies a plurality of keyword types;

extracting, by the one or more computer processors, one or more keywords from the message based, at least in part, on at least one of (i) one or more natural-language processing algorithms and (ii) one or more text mining algorithms;

associating, by the one or more computer processors, each of the one or more keywords with a respective keyword type from among the plurality of keyword types;

incorporating, by the one or more computer processors, the one or more keywords into a model that includes a plurality of keywords and describes, at least in part, a topic of a group instant messaging session among the plurality of client devices, wherein the topic of the group instant messaging session is represented, at least in part, by a visual combination of keywords and keyword types such that the visual combination includes a top-ranked keyword of each keyword type that is identified by the template; and displaying, by the one or more processors, the plurality of keywords of the model on a graphical user interface of the first client device, the graphical user interface dividing a message window into a topic summary pane and a message dialogue pane, wherein:

messages exchanged among the plurality of client devices and representing, at least in part, the group instant messaging session are displayed within the message dialogue pane of the message window;

each keyword in the plurality of keywords is displayed on a respective icon among a plurality of icons within the topic summary pane of the message window;

the plurality of icons representing the plurality of keywords are visually grouped and categorized into a plurality of icon categories based, at least in part, on keyword types, each icon category corresponding to a respective keyword type;

within each icon category, the graphical user interface visually distinguishes an icon associated with a top-ranked keyword from any other icon within the respective icon category;

within each icon category, the icon associated with the top-ranked keyword includes a label identifying the respective keyword type; and a plurality of icons associated with top-ranked keywords are visually displayed within the topic summary pane to represent the visual combination of keywords and keyword types that represents the topic of the group instant messaging session.

2. The method of claim 1, further comprising:

selecting, by the one or more computer processors, the plurality of keyword types to include in the model based on the message and at least of (i) the one or more natural-language processing algorithms and (ii) the one or more text mining algorithms.

3. The method of claim 1, further comprising:
determining, by the one or more computer processors, that the message includes an indication of disagreement with a first keyword included in the model, and in response, incrementing a negative vote count that is associated with the first keyword; and
in the model, associating, by the one or more computer processors, the client device with a negative vote that is associated with the first keyword.

4. The method of claim 3, further comprising:
determining, by the one or more computer processors, that the negative vote count exceeds an opposition limit threshold, and in response, removing the first keyword from the model.

5. The method of claim 3, further comprising:
ranking, by the one or more computer processors, the first keyword and a second keyword based, at least in part, on the negative vote that is associated with the first keyword and the client device, wherein the first keyword and the second keyword are associated with a specific keyword type of the plurality of keyword types.

6. The method of claim 5, wherein:
a first icon is associated with the first keyword;
a second icon is associated with the second keyword; and
the instructions describing how to update the model include instructions to present the first icon in relation to the second icon such that a visual representation of the first and second icon indicates that the second keyword has a higher rank than the first keyword by displaying the first icon, at least in part, overtop the second icon.

7. The method of claim 1,
wherein the first client device of the plurality of client devices displays, by the one or more computer processors, the plurality of icons within the topic summary pane such that the plurality of keyword types are differentiated within the topic summary pane of the graphical user interface based on at least one of color and shape.

8. The method of claim 7, further comprising:
the first client device of the plurality of client devices displaying, by the one or more computer processors, each top-ranked keyword on the graphical user interface such that each top-ranked keyword is represented by a respective icon of a larger size than every other icon associated with the respective keyword type.

9. The method of claim 1, wherein the plurality of keyword types includes a first keyword type that represents when an event will occur, a second keyword type that represents a type of event, and a third keyword type that represents where the event will occur, a combination of the top-ranked keyword of the first keyword type, the top-ranked keyword of the second keyword type, and the top-ranked keyword of the third keyword type representing at least partial agreement among users of the plurality of client devices on an event time, an event type, and an event place from among the plurality of keywords of the model describing the topic of the group instant messaging session among the plurality of client devices.

10. The method of claim 1, wherein a combination of a top-ranked keyword of the first keyword type, a top-ranked keyword of the second keyword type, and a top-ranked keyword of the third keyword type represents at least partial agreement among users of the plurality of client devices as to the first, second, and third keyword types from among the plurality of keywords of the model describing the topic of the group instant messaging session among the plurality of client devices.

* * * * *